(12) United States Patent
Raether

(10) Patent No.: US 10,350,531 B2
(45) Date of Patent: *Jul. 16, 2019

(54) OVATE TUBULAR FILTER CARTRIDGES AND FILTER SYSTEMS USING THE SAME

(71) Applicant: DONALDSON COMPANY, INC., Minneapolis, MN (US)

(72) Inventor: Thomas D. Raether, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/462,978

(22) Filed: Mar. 20, 2017

(65) Prior Publication Data
US 2017/0189845 A1    Jul. 6, 2017

Related U.S. Application Data

(63) Continuation of application No. 14/211,362, filed on Mar. 14, 2014.
(Continued)

(51) Int. Cl.
 B01D 46/24 (2006.01)
 B01D 46/52 (2006.01)
 B01D 46/00 (2006.01)

(52) U.S. Cl.
 CPC ..... B01D 46/2414 (2013.01); B01D 46/0067 (2013.01); B01D 46/2411 (2013.01);
(Continued)

(58) Field of Classification Search
 CPC ............ B01D 46/2411; B01D 46/2414; B01D 2275/20; B01D 2275/206;
(Continued)

(56) References Cited

U.S. PATENT DOCUMENTS 3,417,551 A    12/1968  Bonell
3,771,295 A    11/1973  Wheeler, Jr.
(Continued)

FOREIGN PATENT DOCUMENTS

DE          1094108 B       1/1960
DE         15 26 667 B1    12/1969
(Continued)

OTHER PUBLICATIONS

U.S. Appl. No. 61/648,492, filed May 17, 2012, Raether.
(Continued)

*Primary Examiner* — Robert Clemente
(74) *Attorney, Agent, or Firm* — Mueting, Raasch, & Gebhardt, P.A.

(57) ABSTRACT

Filter cartridges including tubular filter media having ovate cross-sections and filter systems using the ovate tubular filter cartridges are described herein. The inner perimeters of the ovate cross-sections of one or more of the filter cartridges may be asymmetric, i.e., the inner perimeters of the cross-sections of the tubular filter media in the filter cartridges may have no lines about which they are symmetric. The inner perimeters of the ovate cross-sections of the tubular filter media in one or more of the filter cartridges may have only one line of symmetry.

88 Claims, 7 Drawing Sheets

Related U.S. Application Data

(60) Provisional application No. 61/789,385, filed on Mar. 15, 2013.

(52) U.S. Cl.
CPC ...... *B01D 46/521* (2013.01); *B01D 2275/206* (2013.01); *B01D 2275/207* (2013.01); *B01D 2275/208* (2013.01)

(58) Field of Classification Search
CPC ........ B01D 2275/207; B01D 2275/208; B01D 46/0067; B01D 46/0068; B01D 46/521
See application file for complete search history.

(56) References Cited

U.S. PATENT DOCUMENTS

| | | | |
|---|---|---|---|
| 3,778,985 A | 12/1973 | Daigle et al. | |
| 3,942,962 A | 3/1976 | Duyckinck | |
| 4,218,227 A | 8/1980 | Frey | |
| 4,395,269 A | 7/1983 | Schuler | |
| 4,424,070 A | 1/1984 | Robinson | |
| 4,436,536 A | 3/1984 | Robinson | |
| 4,443,237 A | 4/1984 | Ulvestad | |
| 4,445,915 A | 5/1984 | Robinson | |
| 4,632,680 A | 12/1986 | Klimczak | |
| 4,661,131 A | 4/1987 | Howeth | |
| 4,715,954 A | 12/1987 | DeGraffenreid | |
| 4,954,255 A | 9/1990 | Muller et al. | |
| 5,190,651 A | 3/1993 | Spencer et al. | |
| 5,207,812 A | 5/1993 | Tronto et al. | |
| 5,211,846 A | 5/1993 | Kott et al. | |
| 5,222,488 A | 6/1993 | Forsgren | |
| 5,562,746 A | 10/1996 | Raether | |
| 5,730,766 A | 3/1998 | Clements | |
| 5,851,390 A | 12/1998 | Lemonnier | |
| D417,268 S | 11/1999 | Gillingham | |
| 6,090,173 A | 7/2000 | Johnson et al. | |
| RE37,163 E | 5/2001 | Oussoren et al. | |
| 6,387,162 B1 | 5/2002 | Kosmider et al. | |
| 6,488,746 B1 | 12/2002 | Kosmider et al. | |
| D484,584 S | 12/2003 | Anderson et al. | |
| D499,177 S | 11/2004 | Kosmider et al. | |
| 6,902,592 B2 | 6/2005 | Green et al. | |
| D545,396 S | 6/2007 | Casey et al. | |
| 7,282,077 B2 | 10/2007 | Honisch et al. | |
| 7,481,863 B2 | 1/2009 | Oelpke et al. | |
| 7,520,913 B2 | 4/2009 | Mills et al. | |
| 7,611,561 B2 | 11/2009 | Hill, Jr. et al. | |
| 7,641,708 B2 | 1/2010 | Kosmider et al. | |
| 7,699,042 B2 | 4/2010 | Steinman et al. | |
| D656,160 S | 3/2012 | Strommen et al. | |
| 8,128,724 B2 | 3/2012 | Mills et al. | |
| 8,206,483 B2 | 6/2012 | Rieger | |
| 8,356,716 B1 | 1/2013 | Kruckenberg et al. | |
| 8,413,818 B1 | 4/2013 | Kruckenberg et al. | |
| 8,580,109 B2 | 11/2013 | Kruckenberg et al. | |
| 8,591,736 B2 | 11/2013 | Kruckenberg et al. | |
| 8,679,215 B2 | 3/2014 | Lim et al. | |
| 8,979,964 B2 | 3/2015 | Muenkel et al. | |
| 2008/0092501 A1 | 4/2008 | Sporre et al. | |
| 2012/0031058 A1 | 2/2012 | Coulonvaux et al. | |
| 2012/0159910 A1 | 6/2012 | Mills et al. | |
| 2012/0192537 A1 | 8/2012 | Coulonvaux et al. | |
| 2013/0305667 A1 | 11/2013 | Raether | |
| 2013/0305926 A1 | 11/2013 | Raether | |

FOREIGN PATENT DOCUMENTS

| | | |
|---|---|---|
| DE | 10 2004 005904 A1 | 9/2005 |
| EP | 0754850 A1 | 1/1997 |
| EP | 1795743 B1 | 12/2009 |
| FR | 896769 A | 3/1945 |
| KR | 10-2010-0128299 A | 12/2010 |
| WO | WO 2009/039285 A1 | 3/2009 |
| WO | WO 2012/146557 A1 | 11/2012 |
| WO | WO 2013/173691 A1 | 11/2013 |
| WO | WO 2013/173692 A1 | 11/2013 |

OTHER PUBLICATIONS

U.S. Appl. No. 61/648,494, filed May 17, 2012, Raether.
Anonymous: "Air Filter Cartridge 691667" Jul. 1, 2014; retrieved from the Internet: URL: http://www.briggsandstratton.com/us/en/shop/parts-and-accessories/filters/air%20filter%20cartridge%20691667. Retrieved on Jul. 2, 2014.
Anonymous: "Air Filter Cartridge 795066" Jul. 1, 2014; retrieved from the Internet: URL: http://www.briggsandstratton.com/us/en/shop/parts-and-accessories/filters/air%20filter%20cartridge%20795066. Retrieved on Jul. 2, 2014.
International Search Report and Written Opinion from PCT/US2014/027884, dated Jul. 21, 2014; 13 pgs.
International Preliminary Report on Patentability from PCT/US2014/027884, dated Sep. 15, 2015; 9 pgs.

OVATE TUBULAR FILTER CARTRIDGES AND FILTER SYSTEMS USING THE SAME

RELATED APPLICATION

This is a continuation application of U.S. application Ser. No. 14/211,362 filed on Mar. 14, 2014, which claims the benefit under 35 U.S.C. § 119 of U.S. Provisional Patent Application No. 61/789,385 filed on Mar. 15, 2013 and titled OVATE TUBULAR FILTER CARTRIDGES AND FILTER SYSTEMS USING THE SAME, each of which is incorporated herein by reference in its entirety.

Filter cartridges including tubular filter media having ovate cross-sections and filter systems using the ovate tubular filter cartridges are described herein.

BACKGROUND

Particulate matter is suspended in air or other gas streams in many different industries and, in many instances, the particulate matter needs to be removed from the gas streams. Systems for cleaning a gas stream laden with particulate matter include air filter systems having filter elements located in a housing. The filter element may be in the form of a bag or sock of a suitable fabric or pleated paper. The gas stream, contaminated with particulate, typically is passed through the housing so that the particulate are captured and retained by the filter element. Cleaning is accomplished, in some systems, by periodically pulsing a brief jet of pressurized air into the interior of the filter element to reverse the air flow through the filter element, causing the collected contaminants to be collected. Examples of such air filter systems are disclosed in, for example, U.S. Pat. No. 4,218,227 (Frey) and U.S. Pat. No. 4,395,269 (Schuler).

In a common design, an air filter system has a clean air chamber and a dirty air chamber. The two chambers are separated by a sheet metal, commonly referred to as a tube sheet. The tube sheet has a number of openings over which filter elements are placed. Particulate-laden air is introduced into the dirty air chamber, and the particulates collect onto the filter elements as the air moves through the openings in the tube sheet from the dirty air chamber into the clean air chamber. From the clean air chamber, the cleaned air is exhausted into the environment, or recirculated for other uses. For example, U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 4,661,131 (Howeth), U.S. Pat. No. 6,488,746 (Kosmider et al.), and U.S. Pat. No. 8,128,724 (Mills et al.) disclose examples of a variety of filter element designs.

SUMMARY

Filter cartridges including tubular filter media having ovate cross-sections and filter systems using the ovate tubular filter cartridges are described herein.

The filter cartridges having filter media shaped or formed into ovate cross-sections as described herein may, in one or more embodiments, exhibit improved particulate loading capacity because more of the filter media faces downward than upward. The downward facing filter media may, in or more embodiments, be less susceptible to particulate loading during use than filter media facing upward.

Although described as ovate or ovoidal in shape, the cross-sections of the tubular filter media in the filter cartridges described herein may, in one or more embodiments, have one or more flat edges, i.e., the ovate or ovoidal cross-sections may not be true ovoids including only curved lines. Rather, only portions of the cross-sectional shapes of one or more embodiments of the tubular filter cartridges may be in the form of true ovoids.

In one or more embodiments, the inner perimeters of the ovate cross-sections of the filter cartridges described herein may be asymmetric, i.e., there may be no line about which the inner perimeters of the cross-sections of the tubular filter media in the filter cartridges are symmetric. In one or more alternative embodiments, the inner perimeters of the ovate cross-sections of the tubular filter media in the filter cartridges may have only one line of symmetry. That single line of symmetry may, in one or more embodiments, be described as extending through a top and a bottom of the tubular filter media.

In a first aspect, one or more embodiments of the filter cartridges described herein include: tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media; a filter cartridge housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter; wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section; wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; wherein the bottom axis intersection point does not bisect the maximum height of the cross-section as measured between the top and bottom points.

In one or more embodiments of filter cartridges as described herein, the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point. In one or more embodiments, the bottom section height is greater than zero. In one or more embodiments, the bottom section height is greater than or equal to 0.1 of the maximum height.

In one or more embodiments of filter cartridges as described herein, the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length. In one or more embodiments, the bottom perimeter section length is 1.2 or more times greater than the top perimeter section length. In one or more embodiments, the bottom perimeter section length is 2 or more times greater than the top perimeter section length.

In one or more embodiments of filter cartridges as described herein, the inner perimeter of the cross-section comprises a bottom perimeter section containing the bottom point and extending from the first point to the second point, wherein the entire bottom perimeter section is continuously curved from the first point to the second point.

In one or more embodiments of filter cartridges as described herein, no section of the inner perimeter between the first point and the second point lies on a straight line for a distance of more than 1 centimeter.

In one or more embodiments of filter cartridges as described herein, the axis of maximum height does not lie on a line of symmetry of the inner perimeter of the cross-section.

In one or more embodiments of filter cartridges as described herein, the inner perimeter of the cross-section defines only one line of symmetry.

In one or more embodiments of filter cartridges as described herein, the inner perimeter of the cross-section defines only one line of symmetry, and wherein the axis of maximum height is coincident with the line of symmetry.

In one or more embodiments of filter cartridges as described herein, the inner perimeter of the cross-section is asymmetric.

In a second aspect, one or more embodiments of the filter cartridges described herein may include: tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media; a filter cartridge housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter having an ovate shape; wherein the ovate shape of the inner perimeter of the cross-section is asymmetric.

In one or more embodiments of filter cartridges as described herein, the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section; wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; and wherein the bottom axis intersection point does not bisect the maximum height of the cross-section as measured between the top and bottom points.

In one or more embodiments of filter cartridges as described herein, the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point. In one or more embodiments, the bottom section height is greater than zero. In one or more embodiments, the bottom section height is greater than or equal to 0.1 of the maximum height.

In one or more embodiments of filter cartridges as described herein, the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length. In one or more embodiments, the bottom perimeter section length is 1.2 or more times greater than the top perimeter section length. In one or more embodiments, the bottom perimeter section length is 2 or more times greater than the top perimeter section length.

In one or more embodiments of filter cartridges as described herein, the inner perimeter of the cross-section comprises a bottom perimeter section containing the bottom point and extending from the first point to the second point, wherein the entire bottom perimeter section is continuously curved from the first point to the second point.

In one or more embodiments of filter cartridges as described herein, no section of the inner perimeter between the first point and the second point lies on a straight line for a distance of more than 1 centimeter.

In a third aspect, one or more embodiments of the filter cartridges described herein may include: tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media; a filter cartridge housing comprising a first end cap at the first end of the tubular filter media and a second end cap at the second end of the tubular filter media; wherein, in a cross-section taken transverse to the tube axis at any location along a majority of the tubular filter media length, the interior surface of the tubular filter media defines an inner perimeter; wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section; wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height; wherein the cross-section comprises a bottom section height measured along the axis of maximum height from the bottom point to the bottom axis intersection point; wherein the inner perimeter of the cross-section comprises a bottom perimeter section containing the bottom point, wherein the bottom perimeter section comprises a bottom perimeter section length measured along the inner perimeter from the first point to the second point; wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end; wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter; wherein the top section height is equal to the bottom section height; and wherein the bottom perimeter section length is greater than the top perimeter section length.

In one or more embodiments of filter cartridges as described herein, the bottom perimeter section length is 1.2 or more times greater than the top perimeter section length.

In one or more embodiments of filter cartridges as described herein, the bottom perimeter section length is 2 or more times greater than the top perimeter section length.

In one or more embodiments of filter cartridges as described herein, the bottom section height is greater than zero.

In one or more embodiments of filter cartridges as described herein, the bottom section height is greater than or equal to 0.1 of the maximum height.

In one or more embodiments of filter cartridges as described herein, the bottom section height is less than or equal to 0.4 of the maximum height measured along the axis of maximum height from the top point to the bottom point.

In one or more embodiments of filter cartridges as described herein, the inner perimeter of the cross-section comprises a bottom perimeter section containing the bottom point and extending from the first point to the second point, wherein the entire bottom perimeter section is continuously curved from the first point to the second point.

In one or more embodiments of filter cartridges as described herein, no section of the inner perimeter between the first point and the second point lies on a straight line for a distance of more than 1 centimeter.

In one or more embodiments of filter cartridges as described herein, the axis of maximum height does not lie on a line of symmetry of the inner perimeter of the cross-section.

In one or more embodiments of filter cartridges as described herein, the inner perimeter of the cross-section defines only one line of symmetry.

In one or more embodiments of filter cartridges as described herein, the inner perimeter of the cross-section defines only one line of symmetry, and wherein the axis of maximum height is coincident with the line of symmetry.

In one or more embodiments of filter cartridges as described herein, the inner perimeter of the cross-section is asymmetric.

In one or more embodiments of filter cartridges as described herein, an inscribed circle located within the inner perimeter of the cross-section occupies less than all and 60% or more of an inner area defined by the inner perimeter. In one or more embodiments, the inscribed circle located within the inner perimeter of the cross-section occupies 70% or more of the inner area defined by the inner perimeter. In one or more embodiments, the inscribed circle located within the inner perimeter of the cross-section occupies 80% or more of the inner area defined by the inner perimeter.

In one or more embodiments of filter cartridges as described herein, an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle. In one or more embodiments, the maximum radial gap is 0.25 or less of the diameter of the inscribed circle.

In one or more embodiments of filter cartridges as described herein, the first end cap comprises an end cap inner perimeter, and wherein an alignment mechanism comprising a notch that comprises a notch opening facing the interior volume, wherein the notch extends from the notch opening towards the end cap inner perimeter. In one or more embodiments, the alignment mechanism comprises two or more notches, wherein each notch of the two or more notches comprises a notch opening facing the interior volume, and wherein each notch of the two or more notches extends from the notch opening towards the end cap inner perimeter. In one or more embodiments, the second end cap comprises an alignment mechanism comprising one or more notches, wherein each notch of the two or more notches of the second end cap comprises a notch opening facing the interior volume, and wherein each notch of the one or more notches of the second end cap extends from the notch opening towards the end cap inner perimeter.

In one or more embodiments of filter cartridges as described herein, the cross-section is taken transverse to the tube axis at any location along 10% or more, optionally 25% or more, and optionally 50% or more of the tubular filter media length.

In one or more embodiments of filter cartridges as described herein, the tubular filter media comprises pleats extending between the interior surface and the exterior surface.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the filter cartridges or filter systems using the filter cartridges described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
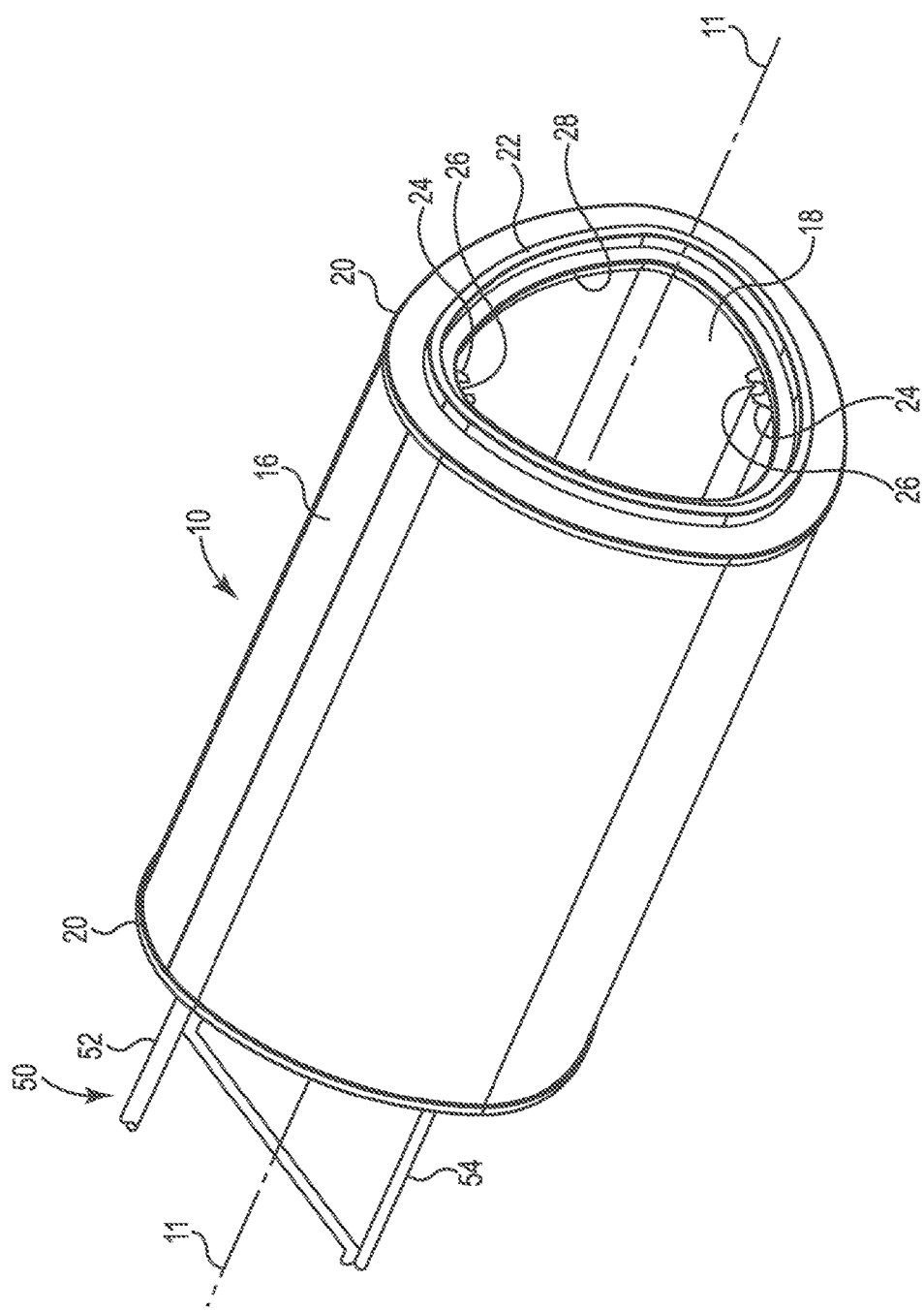
FIG. 1 is a perspective view of one illustrative embodiment of a filter cartridge as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The filter cartridges described herein are fluid filters, i.e., the filter cartridges described herein filter or remove particulates from a fluid stream. In one or more embodiments, the filter cartridges described herein are gas filters used to remove particulates from a gas stream. The gas being filtered is, in many instances, air, although many other gas streams may be filtered using the filter cartridges described herein.

Figure 2:
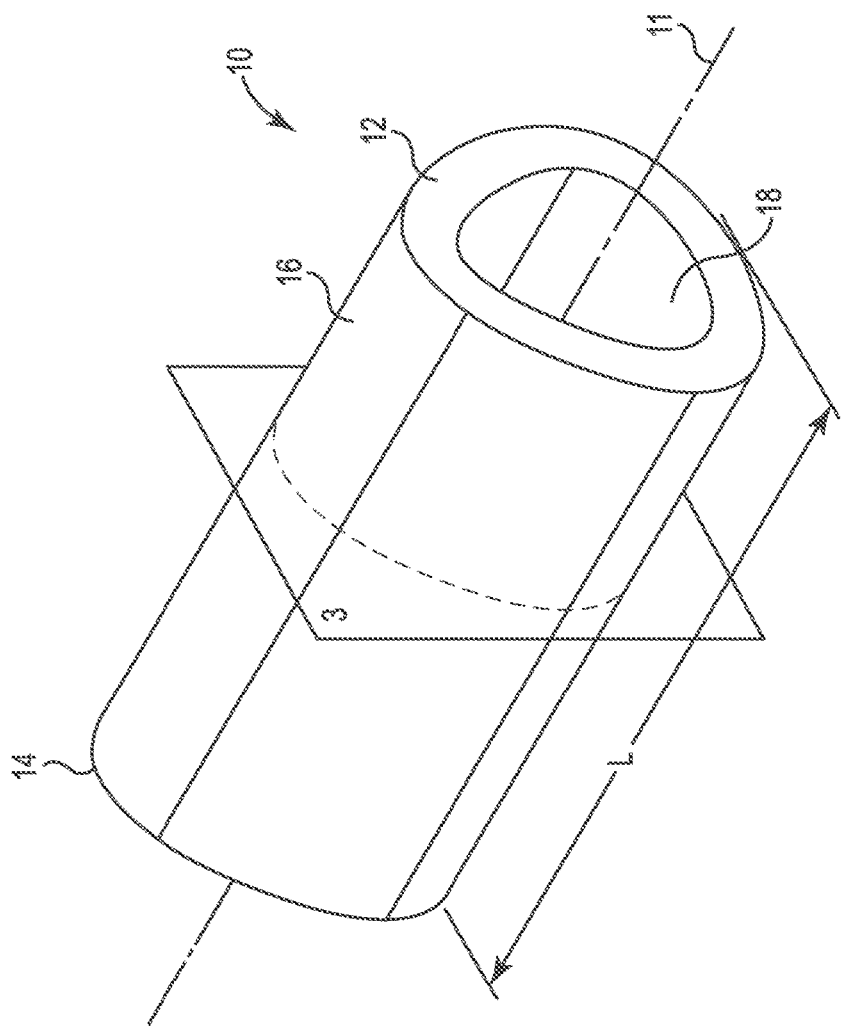
FIG. 2 is a perspective view of the filter media in the filter cartridge of FIG. 1.

One illustrative embodiment of an ovate filter cartridge as described herein is depicted in the perspective views of FIGS. 1 and 2. The filter cartridge includes filter media 10 having end caps 20 located on each of the first end 12 and the second end 14 of the filter media 10.

The end cap 20 on first end 12 of the filter media 10 may, in one or more embodiments, have an opening that allows access to the interior volume of filter cartridge. The end cap 20 on the opposite end of the filter media 10 may, in one or more embodiments, be closed so that it prevents access to the interior volume of the filter cartridge and so that gas (e.g., air) entering the interior volume of the filter cartridge through the end cap 20 on the first end 12 of the filter media 10 must exit through the filter media in the filter cartridge. In one or more alternative embodiments, both end caps 20 may be open to allow access to the interior volume of the filter cartridge.

In one or more embodiments, a gasket 22 may be provided on the end cap 20 to seal the filter cartridge over an opening in, e.g., a tubesheet, a venturi, or other structure through which gas is delivered into the interior volume of the filter cartridge.

A tube axis 11 extends through the tubular filter cartridge between the first end 12 and the second end 14. The filter media 10 has a length L between its first end 12 and its second end 14 as depicted in FIG. 2. The filter media 10 in the filter cartridges described herein defines an exterior surface 16 and interior surface 18 located around the tube axis 11. The interior surface 18 faces an interior volume of the filter cartridge 10 and the exterior surface 16 faces away from that interior volume.

Although not depicted in the illustrative embodiment of filter cartridge, in one or more embodiments of the filter cartridges as described herein, an outer liner may be provided over the exterior surface of the filter media and/or an inner liner may be provided over the inner surface of the filter media to offer e.g., protection, support, etc. to the filter media. Examples of some liners that may be used in connection with the filter cartridges described herein may be found in, e.g., U.S. Pat. No. 6,488,746 (Kosmider et al.), U.S. Pat. No. 8,128,724 (Mills et al.), etc. One or both the liners may, in one or more embodiments, be flexible enough to adopt the ovate cross-sectional shape of the tubular filter cartridges as described herein. In one or more alternative embodiments, one or both of the liners may be formed into the ovate cross-sectional shapes described herein and retain those shapes in the absence of any external force acting on the liner.

Figure 3:
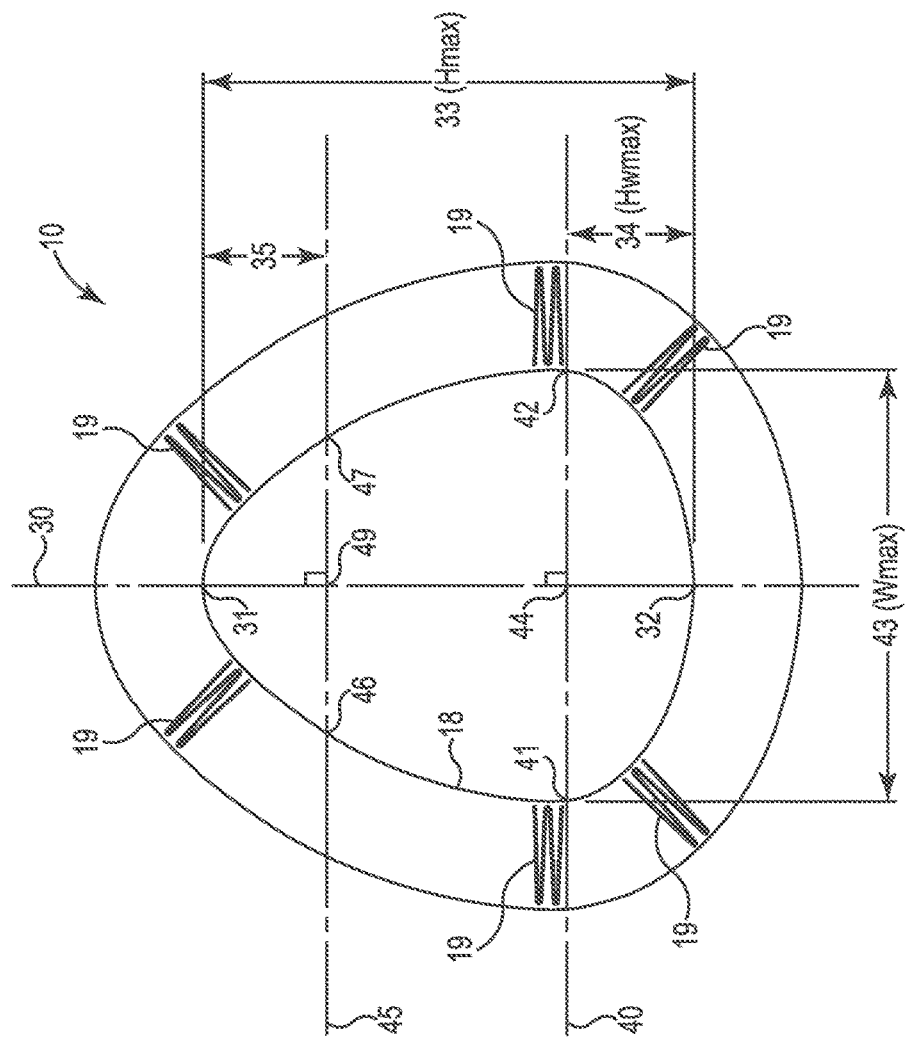
FIG. 3 is a cross-sectional view of the filter media of FIG. 2 taken in plane 3 as depicted in FIG. 2.
Figure 4:
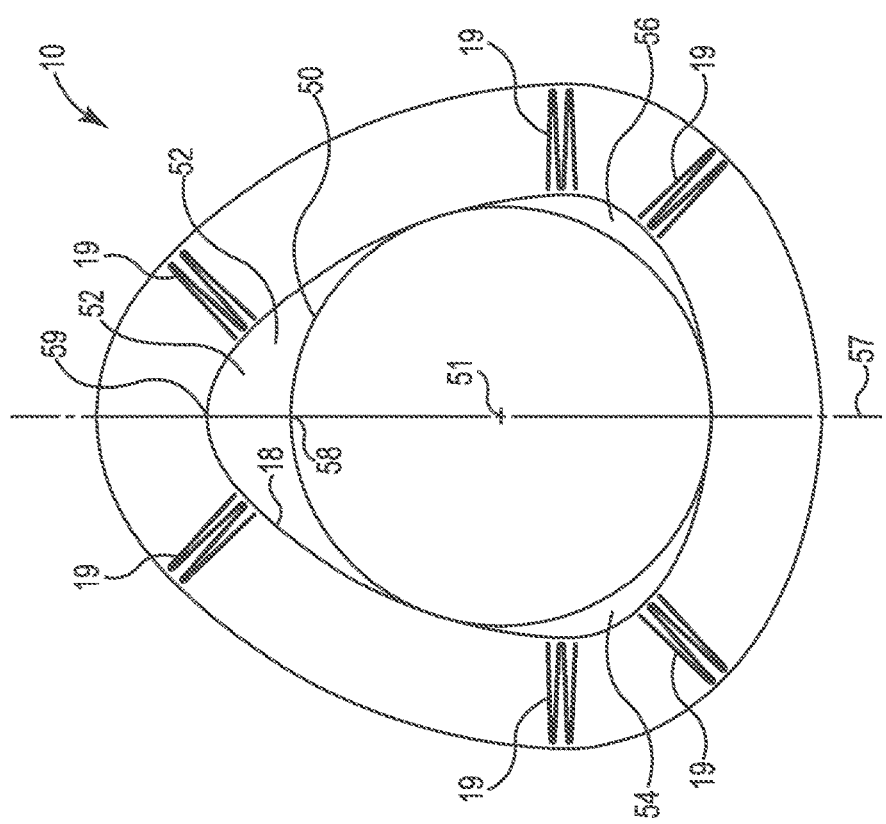
FIG. 4 is another cross-sectional view of the filter media of FIG. 2 taken in plane 3 with an inscribed circle located within the inner perimeter.

FIGS. 3 and 4 depict one illustrative embodiment of an ovate cross-section formed by tubular filter media 10 in the filter cartridge, with the cross-section being taken transverse to the tube axis 11. For example, the cross-section seen in FIGS. 3 and 4 may be taken in the plane 3 depicted in FIG. 2, where plane 3 is oriented orthogonal to the tube axis 11. The cross-sections of the tubular filter media described herein may, in one or more embodiments, be taken at any location along the length L of the filter cartridge containing the filter media 10. In one or more alternative embodiments, the cross-sections of the tubular filter media 10 as described herein may be found at any location along 10% or more of the length L of the filter media. In other words, there may be portions of the length L of the tubular filter media that do not exhibit the characteristics described herein in a cross-section thereof. In one or more alternative embodiments, the cross-sections of the tubular filter media as described herein may be found at any location along 25% or more of the length L of the filter media. In one or more alternative embodiments, the cross-sections of the tubular filter media as described herein may be found at any location along 50% or more of the length L of the filter media.

In one or more embodiments, the tubular filter media 10 may have the same shape along the entire length L, although that is not required in all embodiments (i.e., in one or more embodiments, the cross-sectional shape of the tubular filter media 30 may change over the length L).

As seen in the ovate cross-section depicted in FIGS. 3 and 4, the tubular filter media 10 defines an inner perimeter that corresponds to the interior surface 18 of the filter media 10. Because the inner perimeter of the cross-section is essentially coincident with the interior surface 18 of the filter media 10, reference number 18 may also be used herein to refer to the inner perimeter of the cross-section. The filter media provided in the filter cartridges may take a variety of different forms, but in one or more embodiments, the filter media 10 may include pleats 19 having internal folds located along the inner perimeter as represented by the interior surface 18 and external folds located along the outer perimeter of the filter media 10. In one or more embodiments, the folds in the pleats 19 will typically be located along the surface of an inner liner that follows and/or defines the shape of the inner perimeter and the interior surface 18 of the filter cartridges described herein.

Although the cross-sections of the tubular filter media in the filter cartridges described herein are discussed using terms such as up, down, top, bottom, etc., those terms are used only to provide a frame of reference for describing the shapes and/or features of the cross-sections. In particular, it should be understood that the filter cartridges described herein may be used in a filter system in any orientation. For example, in one or more embodiments, a surface identified as a "bottom" of the filter media or filter cartridge may be found on a top surface of the filter cartridge (relative to the direction of gravity) when the filter cartridges are installed within a filter system.

In one or more embodiments, the ovate cross-section of the filter media 10 has a maximum height 33 (Hmax) that is measured between a top point 31 and a bottom point 32 along an axis of maximum height 30. The top point 31 and the bottom point 32 are located on the inner perimeter 18 of the cross-section of the filter media 10 and are, in one or more embodiments, the points that are furthest apart from each other along any straight line extending across the inner perimeter 18 of the cross-section. In some instances, the inner perimeter 18 may have two or more axes of maximum height, each of which intersects the inner perimeter 18 at two points that are equidistant apart from each other along two or more different straight lines extending across the inner perimeter 18 of the cross-section. In such a case, any one of the axes of maximum height may be used to characterize the ovate cross-section as described herein.

The inner perimeter 18 of the ovate cross-section of the filter media 10 as described herein also has a maximum width 43 (Wmax) measured between a first point 41 and a second point 42 on the inner perimeter 18. The first point 41 and the second point 42 are located on an axis of maximum width 40 that is located along a straight line perpendicular to the axis of maximum height 30. The axis of maximum width 40 intersects the axis of maximum height 30 at a bottom axis intersection point 44 where the first point 41 and the second point 42 at which the axis of maximum width 40 intersects the inner perimeter 18 are located furthest apart from each other on any straight line perpendicular to the axis of maximum height 30.

Because of the ovate or ovoid shape of the cross-section of the filter media 10, the bottom axis intersection point 44 does not, in one or more embodiments, bisect the maximum height of the cross-section as measured between the top point 31 and the bottom point 32 along the axis of maximum height 30.

In one or more embodiments of the tubular filter media described herein, the ovate cross-section, as depicted in, e.g., FIG. 3, may define a bottom section height 34 (Hwmax) measured along the axis of maximum height 30 from the bottom point 32 to the bottom axis intersection point 44. In one or more embodiments, the bottom section height 34 may be less than or equal to 0.4 of the maximum height as measured along the axis of maximum height 30 from the top point 31 to the bottom point 32. In one or more embodiments, the bottom section height 34 is greater than zero. In one or more embodiments, the bottom section height 34 is greater than or equal to 0.1 of the maximum height as measured along the axis of maximum height 30 from the top point 31 to the bottom point 32.

Another manner in which the ovate cross-sections of tubular filter media of filter cartridges as described herein may be characterized is in terms of the length of the inner perimeter at both the top and bottom of the filter media of the filter cartridge. For example, the inner perimeter 18 of the cross-section of filter media of filter cartridges as described herein may define a bottom perimeter section containing the bottom point 32 and extending from the first point 41 to the second point 42 at which the axis of maximum width 40 intersects the inner perimeter 18. The bottom perimeter section, i.e., the portion of the inner perimeter 18 from the first point 41 to the second point 42 (and including bottom point 32) has a bottom perimeter section length measured along the inner perimeter 18 from the first point 41 to the second point 42.

The inner perimeter 18 of the ovate cross-section of filter media 10 of filter cartridges as described herein may also define a top perimeter section containing the top point 31 at which the axis of maximum height 30 intersects the inner perimeter 18. The top perimeter section extends from a first end 46 to a second end 47 on the inner perimeter 18, the first end 46 being located on the inner perimeter 18 between the first point 41 and the top point 31 and the second end 47 being located on the inner perimeter 18 between the second point 42 and the top point 31. The first end 46 and the second end 47 of the top perimeter section are the points at which a top perimeter section line 45 intersects the inner perimeter 18. The top perimeter section line 45 is a straight line that is perpendicular to the axis of maximum height 30 and intersects the axis of maximum height 30 at a top axis intersection point 49. The top axis intersection point 49 is located within the inner perimeter 18 between first point 31 and second point 32 at which the axis of maximum height 30 intersects the inner perimeter 18. The top axis intersection point 49 defines a top section height 35 measured along the axis of maximum height 30 from the top axis intersection point 49 to the top point 31 on the inner perimeter 18.

In one or more embodiments, the top section height 35, e.g., the distance from the top axis intersection point 49 to the top point 31 in the illustrative embodiment depicted in FIG. 3, is equal to the bottom section height 34 in the ovate cross-sections of filter media in filter cartridges as described herein. In one or more embodiments, the bottom perimeter section length as measured along the inner perimeter 18 between points 41 and 42 (and including bottom point 32) is greater than the top perimeter section length as measured along the inner perimeter 18 between first end 46 and second end 47 (and including top point 31). In one or more embodiments, the bottom perimeter section length may be 1.2 or more times greater than the top perimeter section length. In one or more alternative embodiments, the bottom perimeter section length may be two or more times greater than the top perimeter section length.

In one or more embodiments of the filter media 10 in filter cartridges as described herein, the bottom perimeter section of the inner perimeter 18 located between the first point 41 and the second point 42 may be continuously curved from the first point 41 to the second point 42. As used herein, "continuously curved" means that the inner perimeter 18 includes no straight portions between first point 41 and second point 42, although the curvature of the inner perimeter 18 may not be uniform along the entire length of the bottom perimeter section. In one or more alternative embodiments, the bottom perimeter section of the inner perimeter 18 may include one or more limited portions that form a straight line, however, no portion of the bottom perimeter section of the inner perimeter 18 lies on a straight line for a distance of more than 1 centimeter.

One or more embodiments of the filter media 10 in filter cartridges as described herein may also include a line of symmetry defined by the inner perimeter 18 of the cross-section as depicted in, e.g., FIGS. 3 and 4. In particular, filter cartridges having the ovate shapes described herein may, in one or more embodiments, define only a single line of symmetry. In the illustrative embodiment depicted in FIGS. 3 and 4, the inner perimeter 18 of the cross-section of filter media 10 defines a single line of symmetry that is coincident with the axis of maximum height 30. Such a relationship between a line of symmetry and an axis of maximum height may not, however, necessarily be required in all embodiments described herein.

In one or more embodiments of the filter cartridges described herein, it may be possible to provide an inscribed circle 50 located within the inner perimeter 18 of the ovate cross-section of the filter media 10, with the inscribed circles discussed herein being the largest inscribed circles that may be located within the inner perimeter 18 of the cross-section of the filter media 10. Because the inner perimeter 18 is not circular in shape, the inscribed circle 50 occupies less than all of the area within the inner perimeter 18. In the view as seen in FIG. 4, the inscribed circle 40 does not occupy areas 52, 54, and 56 within the inner perimeter 18 of the filter media 10.

In one or more embodiments, the inscribed circle 50 located within the inner perimeter 18 may occupy 60% or more of the inner area defined by the inner perimeter 18. In one or more alternative embodiments, the inscribed circle 50 may occupy 70% or more of the inner area defined by the inner perimeter 18. In one or more additional alternative embodiments, the inscribed circle 50 may occupy 80% or more of the inner area defined by the inner perimeter 18. In the illustrative example depicted in FIG. 4, the inscribed circle 50 occupies more than 80% of the inner area defined by the inner perimeter 18.

The use of an inscribed circles may also provide another way in which the inner perimeters of the cross-sections of tubular filter media in filter cartridges as described herein may be characterized. In connection with the illustrative embodiment depicted in, e.g., FIG. 4, the inscribed circle 50 located within the inner perimeter 18 can be described as defining a maximum radial gap between the inscribed circle 50 and the inner perimeter 18. As depicted in FIG. 4, the maximum radial gap may be measured between points 58 and 59 located along axis 57 that passes through the center 51 of the inscribed circle 50. In one or more embodiments, the maximum radial gap as measured between points 58 and 59 may be 0.5 or less of the diameter of the inscribed circle 50. In one or more alternative embodiments, the maximum radial gap between an inscribed circle and the inner perimeter of a cross-section of filter media in which the inscribed circle is located may be 0.25 or less of the diameter of that inscribed circle. Limiting the maximum radial gap between an inscribed circle and the inner perimeter may, in one or more embodiments, provide improvements in pulse cleaning of a filter cartridge having such characteristics. Further, although this characteristic is not described with respect to the other alternative illustrative embodiments described below with respect to FIGS. 5 and 6, this characteristic may be determined with respect to any tubular filter media used in filter cartridges as described herein and may, in one or more embodiments, be controlled to the ratios described above.

Figure 5:
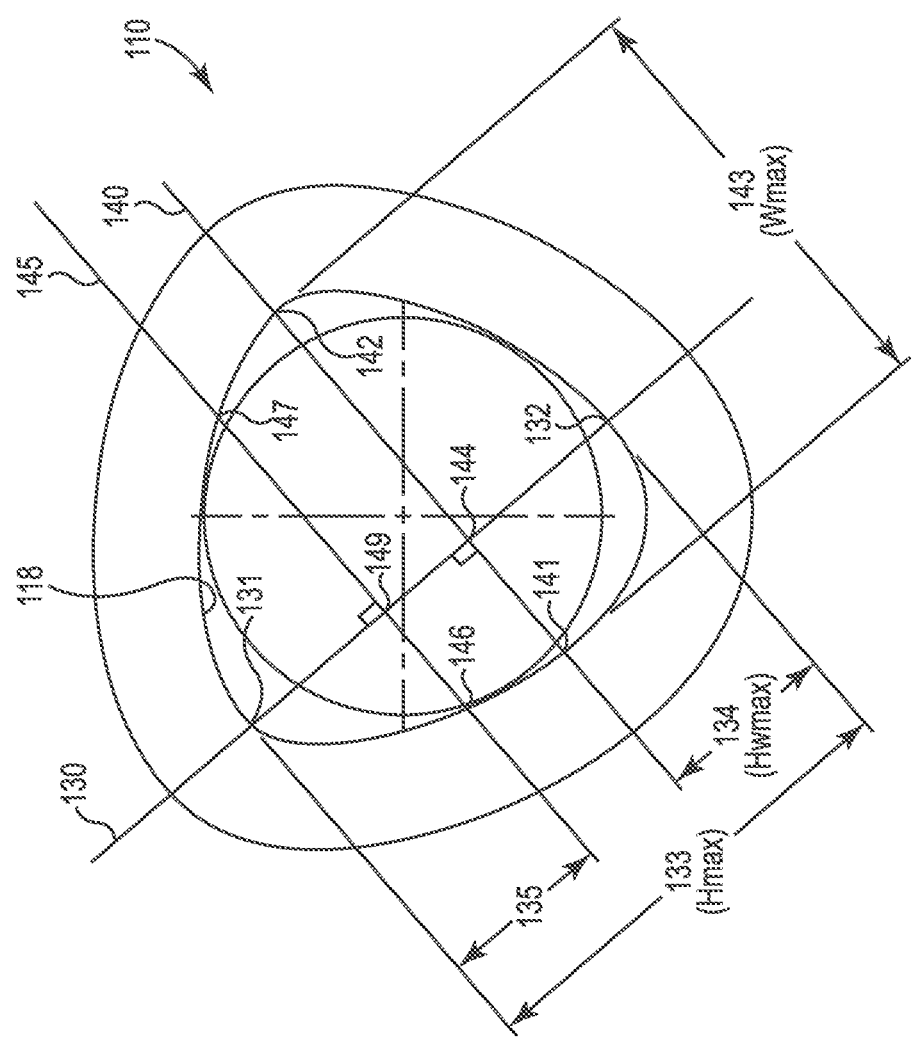
FIG. 5 is a cross-sectional view of the filter media of an alternative embodiment of a filter cartridge as described herein.

Another illustrative embodiment of an ovate cross-section of filter media 110 that may be used in a tubular filter cartridge as described herein is depicted in FIG. 5. Unlike the cross-section of filter media 10 as depicted in FIGS. 3 and 4, the ovate cross-section of filter media 110 depicted in FIG. 5 has an inner perimeter 118 that defines no lines of symmetry, i.e., the inner perimeter 118 of the filter media 110 is asymmetric.

In one or more embodiments, the ovate cross-section of the filter media 110 has a maximum height 133 (Hmax) that is measured between a top point 131 and a bottom point 132 along an axis of maximum height 130. The top point 131 and the bottom point 132 are located on the inner perimeter 118 of the cross-section of the filter media 110 and are, in one or more embodiments, the points that are furthest apart from each other along any straight line extending across the inner perimeter 118 of the cross-section.

The inner perimeter 118 of the ovate cross-section of the filter media 110 as described herein also has a maximum width 143 (Wmax) measured between a first point 141 and a second point 142 on the inner perimeter 118. The first point 141 and the second point 142 are located on an axis of maximum width 140 that is located along a straight line perpendicular to the axis of maximum height 130. The axis of maximum width 140 intersects the axis of maximum height 130 at a bottom axis intersection point 144 where the first point 141 and the second point 142 at which the axis of maximum width 140 intersects the inner perimeter 118 are located furthest apart from each other on any straight line perpendicular to the axis of maximum height 130 between top point 131 and bottom point 132.

Because of the ovate or ovoid shape of the cross-section of the filter media 110, the bottom axis intersection point 144 does not, in one or more embodiments, bisect the maximum height of the cross-section as measured between the top point 131 and the bottom point 132 along the axis of maximum height 130.

In one or more embodiments of the tubular filter media described herein, the ovate cross-section, as depicted in, e.g., FIG. 5, may define a bottom section height 134 (Hwmax) measured along the axis of maximum height 130 from the bottom point 132 to the bottom axis intersection point 144. In one or more embodiments, the bottom section height 134 may be less than or equal to 0.4 of the maximum height as measured along the axis of maximum height 130 from the top point 131 to the bottom point 132. In one or more embodiments, the bottom section height 134 is greater than zero. In one or more embodiments, the bottom section height 134 is greater than or equal to 0.1 of the maximum height as measured along the axis of maximum height 130 from the top point 131 to the bottom point 132.

Another manner in which the cross-sections of tubular filter media of filter cartridges as described herein may be characterized is in terms of the length of the inner perimeter at both the top and bottom of the filter media of the filter cartridge. For example, the inner perimeter 118 of the cross-section of filter media 110 as described herein may define a bottom perimeter section containing the bottom point 132 and extending from the first point 141 to the second point 142 at which the axis of maximum width 140 intersects the inner perimeter 118. The bottom perimeter section, i.e., the portion of the inner perimeter 118 from the first point 141 to the second point 142 (and including bottom point 132) has a bottom perimeter section length measured along the inner perimeter 118 from the first point 141 to the second point 142.

The inner perimeter 118 of the cross-section of filter media 110 of filter cartridges as described herein may also define a top perimeter section containing the top point 131 at which the axis of maximum height 130 intersects the inner perimeter 118. The top perimeter section extends from a first end 146 to a second end 147 on the inner perimeter 118, the first end 146 being located on the inner perimeter 118 between the first point 141 and the top point 131 and the second end 147 being located on the inner perimeter 118 between the second point 142 and the top point 131. The first end 146 and the second end 147 of the top perimeter section are the points at which a top perimeter section line 145 intersects the inner perimeter 118 on opposite sides of the axis of maximum height 130. The top perimeter section line 145 is a straight line that is perpendicular to the axis of maximum height 130 and intersects the axis of maximum height 130 at a top axis intersection point 149. The top axis intersection point 149 is located within the inner perimeter 118 between first point 131 and second point 132 at which the axis of maximum height 130 intersects the inner perimeter 118. The top axis intersection point 149 defines a top section height 135 measured along the axis of maximum height 130 from the top axis intersection point 149 to the top point 131 on the inner perimeter 118.

In one or more embodiments, the top section height 135, e.g., the distance from the top axis intersection point 149 to the top point 131 in the illustrative embodiment depicted in FIG. 5, is equal to the bottom section height 134 in the cross-sections of filter media in filter cartridges as described herein. In one or more embodiments, the bottom perimeter section length as measured along the inner perimeter 118 between points 141 and 142 (and including bottom point 132) is greater than the top perimeter section length as measured along the inner perimeter 118 between first end 146 and second end 147 (and including top point 131). In one or more embodiments, the bottom perimeter section length may be 1.2 or more times greater than the top perimeter section length. In one or more alternative embodiments, the bottom perimeter section length may be two or more times greater than the top perimeter section length.

In one or more embodiments of the filter media 110 in filter cartridges as described herein, the bottom perimeter section of the inner perimeter 118 located between the first point 141 and the second point 142 may be continuously curved from the first point 141 to the second point 142. In one or more alternative embodiments, the bottom perimeter section of the inner perimeter 118 may include one or more limited portions that form a straight line, however, no portion of the bottom perimeter section of the inner perimeter 118 lies on a straight line for a distance of more than 1 centimeter.

Figure 6:
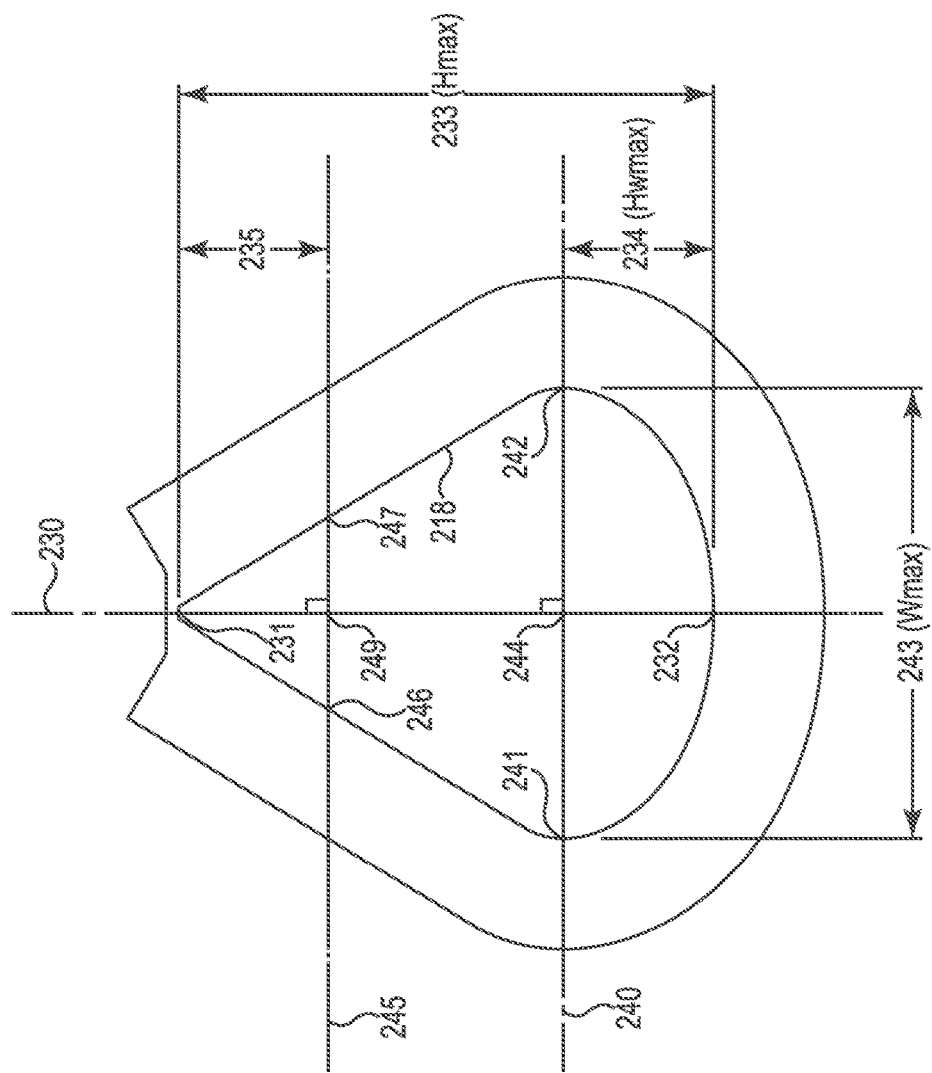
FIG. 6 is a cross-sectional view of the filter media of another alternative embodiment of a filter cartridge as described herein.

Still another illustrative embodiment of tubular filter media 210 having an ovate cross-section that may be used in a tubular filter cartridge as described herein is depicted in FIG. 6. Unlike the cross-section of filter media 10 as depicted in FIGS. 3 and 4 or the cross-section of filter media 110 depicted in FIG. 5, the cross-section of filter media 210 depicted in FIG. 6 has an inner perimeter 218 that includes flat or straight sections. For the purposes of the filter cartridges described herein, however, the cross-section formed by filter media 210 is ovate because it has a base wider than a top.

In one or more embodiments, the cross-section of the filter media 210 has a maximum height 233 (Hmax) that is measured between a top point 231 and a bottom point 232 along an axis of maximum height 230. The top point 231 and the bottom point 232 are located on the inner perimeter 218 of the cross-section of the filter media 210 and are, in one or more embodiments, the points that are furthest apart from each other along any straight line extending across the inner perimeter 218 of the cross-section.

The inner perimeter 218 of the cross-section of the filter media 210 as described herein also has a maximum width 243 (Wmax) measured between a first point 241 and a second point 242 on the inner perimeter 218. The first point 241 and the second point 242 are located on an axis of maximum width 240 that is located along a straight line perpendicular to the axis of maximum height 230. The axis of maximum width 240 intersects the axis of maximum height 230 at a bottom axis intersection point 244 where the first point 241 and the second point 242 at which the axis of maximum width 240 intersects the inner perimeter 218 are located furthest apart from each other on any straight line perpendicular to the axis of maximum height 230 between top point 231 and bottom point 232.

Because of the ovate or ovoid shape of the cross-section of the filter media 210, the bottom axis intersection point 244 does not, in one or more embodiments, bisect the maximum height of the cross-section as measured between the top point 231 and the bottom point 232 along the axis of maximum height 230.

In one or more embodiments of the tubular filter media described herein, the cross-section, as depicted in, e.g., FIG. 6, may define a bottom section height 234 (Hwmax) measured along the axis of maximum height 230 from the bottom point 232 to the bottom axis intersection point 244. In one or more embodiments, the bottom section height 234 may be less than or equal to 0.4 of the maximum height as measured along the axis of maximum height 230 from the top point 231 to the bottom point 232. In one or more embodiments, the bottom section height 234 is greater than zero. In one or more embodiments, the bottom section height 234 is greater than or equal to 0.1 of the maximum height as measured along the axis of maximum height 230 from the top point 231 to the bottom point 232.

Another manner in which the cross-sections of tubular filter media of filter cartridges as described herein may be characterized is in terms of the length of the inner perimeter at both the top and bottom of the filter media of the filter cartridge. For example, the inner perimeter 218 of the cross-section of filter media 210 as described herein may define a bottom perimeter section containing the bottom point 232 and extending from the first point 241 to the second point 242 at which the axis of maximum width 240 intersects the inner perimeter 218. The bottom perimeter section, i.e., the portion of the inner perimeter 218 from the first point 241 to the second point 242 (and including bottom point 232) has a bottom perimeter section length measured along the inner perimeter 218 from the first point 241 to the second point 242.

The inner perimeter 218 of the cross-section of filter media 210 of filter cartridges as described herein may also define a top perimeter section containing the top point 231 at which the axis of maximum height 230 intersects the inner perimeter 218. The top perimeter section extends from a first end 246 to a second end 247 on the inner perimeter 218, the first end 246 being located on the inner perimeter 218 between the first point 241 and the top point 231 and the second end 247 being located on the inner perimeter 218 between the second point 242 and the top point 231. The first end 246 and the second end 247 of the top perimeter section are the points at which a top perimeter section line 245 intersects the inner perimeter 218 on opposite sides of the axis of maximum height 230. The top perimeter section line 245 is a straight line that is perpendicular to the axis of maximum height 230 and intersects the axis of maximum height 230 at a top axis intersection point 249. The top axis intersection point 249 is located within the inner perimeter 218 between first point 231 and second point 232 at which the axis of maximum height 230 intersects the inner perimeter 218. The top axis intersection point 249 defines a top section height 235 measured along the axis of maximum height 230 from the top axis intersection point 249 to the top point 231 on the inner perimeter 218.

In one or more embodiments, the top section height 235, e.g., the distance from the top axis intersection point 249 to the top point 231 in the illustrative embodiment depicted in FIG. 6, is equal to the bottom section height 234 in the cross-sections of filter media in filter cartridges as described herein. In one or more embodiments, the bottom perimeter section length as measured along the inner perimeter 218 between points 241 and 242 (and including bottom point 232) is greater than the top perimeter section length as measured along the inner perimeter 218 between first end 246 and second end 247 (and including top point 231). In one or more embodiments, the bottom perimeter section length may be 1.2 or more times greater than the top perimeter section length. In one or more alternative embodiments, the bottom perimeter section length may be two or more times greater than the top perimeter section length. This relationship between the bottom perimeter section length and the top perimeter section length may be one way of describing that more of the filter media 210 faces downward than upward.

In one or more embodiments of the filter media 210 in filter cartridges as described herein, the bottom perimeter section of the inner perimeter 218 located between the first point 241 and the second point 242 may be continuously curved from the first point 241 to the second point 242. In one or more alternative embodiments, the bottom perimeter section of the inner perimeter 218 may include one or more limited portions that form a straight line, however, no portion of the bottom perimeter section of the inner perimeter 218 lies on a straight line for a distance of more than 1 centimeter.

The filter media 210 is another illustrative example of a cross-section having an inner perimeter 218 that has a line of symmetry. In particular, the inner perimeter 218 defines, at most, only a single line of symmetry. In the illustrative embodiment depicted in FIG. 6, the single line of symmetry is coincident with the axis of maximum height 230. Such a relationship may not, however, necessarily be required in all embodiments described herein.

Although only three different ovate cross-section shapes for filter media 10, 110, and 210 in filter cartridges as described herein are discussed in connection with FIGS. 1 to 6, the descriptions of the various characteristics of those ovate cross-sectional shapes can be applied to an infinite number of different ovate shapes that may be used to form filter media used in tubular filter cartridges as described herein. Accordingly, the specific embodiments disclosed herein should be considered to be illustrative in nature only.

Figure 7:
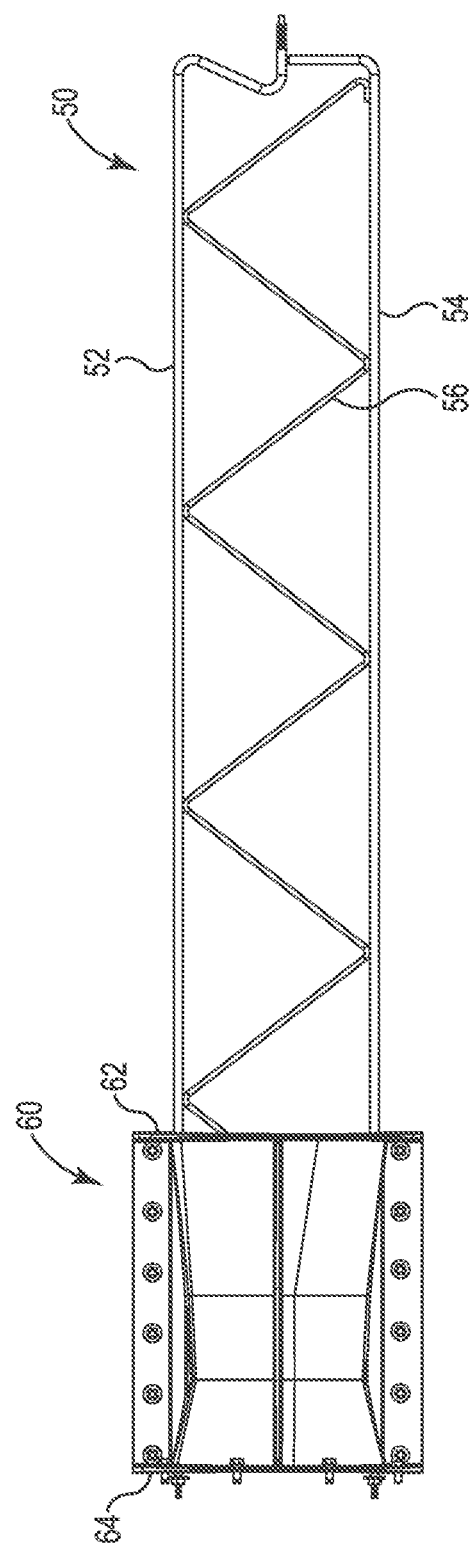
FIG. 7 is a side elevational view of one illustrative embodiment of a yoke and venturi on which a filter cartridge as described herein may be mounted within a filter system.

Referring to FIGS. 1 and 7, in one or more embodiments of the filter cartridges described herein, the end caps 20 on the filter cartridges may include an alignment mechanism in the form of, e.g., optional tabs 24 in which notches 26 are located. The notches 26 may be sized to receive upper and lower members 52 and 54 of a yoke 50 over which the filter cartridge may be mounted in a filter system. Each of the notches 26 may be described as having, in one or more embodiments, an opening that faces the interior volume of the filter cartridges, with the notch 26 extending towards the inner perimeter 28 of the end cap 20. Although each notch 26 is formed in a single tab 24 in the depicted embodiment, in one or more alternative embodiments, a notch 26 may be formed between two members that protrude from the inner perimeter 28 of the end cap 20 where the two members forming the notch 26 are not the same structural member.

Examples of some potentially suitable filter systems that may include yokes over which filter cartridges are mounted and in which the filter cartridges described herein may be used may be described in, e.g., U.S. Pat. No. 3,942,962 (Duyckinck), U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), and U.S. Pat. No. 7,641,708 (Kosmider et al.); as well as, e.g., U.S. Provisional Patent Application No. 61/648,492 (filed on May 17, 2012 with the title: AIR FILTER ASSEMBLY HAVING VENTURI ELEMENTS WITH EXTENDED PULSE OUTLETS) and U.S. Provisional Patent Application No. 61/648,494 (filed on May 17, 2012 with the title: FILTER ASSEMBLY WITH DIRTY AIR CHAMBER VENTURI ELEMENTS).

One illustrative embodiment of a yoke 50 having upper and lower members 52 and 54 is depicted in FIG. 7. The upper and lower members 52 and 54 are structurally connected to each other by intermediate member 56 which, in the illustrative embodiment of FIG. 7, maybe a continuous member that provides structural support to the upper and lower members 52 and 54 and increases the rigidity of the yoke 50. Also depicted in FIG. 7 is a venturi 60 that may be used to move gas into and out of the interior volume of a filter cartridge located on yoke 50. The venturi 60 may have a filter cartridge face 62 against which the end cap (e.g., end cap 20) of a filter cartridge may be positioned and a tubesheet face 64 configured to be attached over an aperture in a tubesheet as described in a variety of the patent documents identified herein.

The yoke 50 is depicted as being partially inserted into the filter cartridge in FIG. 1. Although depicted only on the nearest end cap 20 in FIG. 1, in one or more embodiments, the end caps 20 on both ends of the filter cartridge of FIG. 1 may include tabs 24 having notches 26 formed therein. The use of two tabs 24 in combination with a yoke 50 having two members 52 and 54 may be, in one or more embodiments, be beneficial to prevent, or at least limit, rotation of a filter cartridge about its tube axis 11 when installed on the yoke 50 in a filter system.

Although one or more embodiments of the tubular filter media provided in the filter cartridges described herein may be in the form of pleated filter media, in one or more alternative embodiments, the tubular filter media may or may not be pleated. Further, although the filter media used in the filter cartridges described herein may be used to filter particulate matter from a gas stream, in one or more embodiments, the filter media may be further capable of removing other materials from a gas stream such as, e.g., chemical contaminants, etc.

The filter cartridges described herein may be used in a variety of filtering systems. For example, the filter cartridges may be used in filtering systems similar to those described in, e.g., U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,395,269 (Schuler), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,488,746 (Kosmider et al.) U.S. Pat. No. 6,902,592 (Green et al.), and U.S. Pat. No. 7,641,708 (Kosmider et al.). Still further, the filter cartridges described herein may be used in filtering systems similar to those described in, e.g., U.S. Provisional Patent Application No. 61/648,492 (filed on May 17, 2012 with the title: AIR FILTER ASSEMBLY HAVING VENTURI ELEMENTS WITH EXTENDED PULSE OUTLETS) and U.S. Provisional Patent Application No. 61/648,494 (filed on May 17, 2012 with the title: FILTER ASSEMBLY WITH DIRTY AIR CHAMBER VENTURI ELEMENTS).

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the filter cartridges and filter systems incorporating the filter cartridges are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A filter cartridge comprising:

tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;

a filter cartridge housing comprising a first end cap at the first end of the tubular filter media and a second end cap at the second end of the tubular filter media;

wherein, in a cross-section taken transverse to the tube axis at any location along a majority of the tubular filter media length, the interior surface of the tubular filter media defines an inner perimeter;

wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;

wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;

wherein the bottom axis intersection point does not bisect the maximum height of the cross-section as measured between the top and bottom points;

wherein the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point;

wherein the inner perimeter of the cross-section comprises a bottom perimeter section containing the bottom point, wherein the bottom perimeter section comprises a bottom perimeter section length measured along the inner perimeter from the first point to the second point;

wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;

wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;

wherein the top section height is equal to the bottom section height;

wherein the bottom perimeter section length is greater than the top perimeter section length such that more of the tubular filter media faces downward than upward when the filter cartridge is oriented with the bottom perimeter facing downward;

and wherein an inscribed circle located within the inner perimeter of the cross-section occupies less than all and 60% or more of an inner area defined by the inner perimeter.

2. A filter cartridge according to claim 1, wherein the bottom section height is greater than zero.

3. A filter cartridge according to claim 1, wherein the bottom section height is greater than or equal to 0.1 of the maximum height.

4. A filter cartridge according to claim 1, wherein the bottom perimeter section length is 1.2 or more times greater than the top perimeter section length.

5. A filter cartridge according to claim 1, wherein the bottom perimeter section length is 2 or more times greater than the top perimeter section length.

6. A filter cartridge according to claim 1, wherein the entire bottom perimeter section is continuously curved from the first point to the second point.

7. A filter cartridge according to claim 1, wherein no section of the inner perimeter between the first point and the second point lies on a straight line for a distance of more than 1 centimeter.

8. A filter cartridge according to claim 1, wherein the axis of maximum height does not lie on a line of symmetry of the inner perimeter of the cross-section.

9. A filter cartridge according to claim 1, wherein the inner perimeter of the cross-section defines only one line of symmetry.

10. A filter cartridge according to claim 1, wherein the inner perimeter of the cross-section defines only one line of symmetry, and wherein the axis of maximum height is coincident with the line of symmetry.

11. A filter cartridge according to claim 1, wherein the inner perimeter of the cross-section is asymmetric.

12. A filter cartridge according to claim 1, wherein an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle.

13. A filter cartridge according to claim 1, wherein the cross-section is taken transverse to the tube axis at any location along 10% or more of the tubular filter media length.

14. A filter cartridge according to claim 1, wherein an inscribed circle located within the inner perimeter of the cross-section defines a maximum radial gap between the circle and the inner perimeter that is 0.25 or less of a diameter of the inscribed circle, wherein the maximum radial gap is measured along a radial line extending through a center of the inscribed circle.

15. A filter cartridge comprising:

tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;

a filter cartridge housing comprising a first end cap at the first end of the tubular filter media and a second end cap at the second end of the tubular filter media;

wherein, in a cross-section taken transverse to the tube axis at any location along a majority of the tubular filter media length, the interior surface of the tubular filter media defines an inner perimeter having a continuously curved asymmetric ovate shape;

wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;

wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;

and wherein the bottom axis intersection point does not bisect the maximum height of the cross-section as measured between the top and bottom points;

wherein the cross-section comprises a bottom section height measured along the axis of maximum height from the bottom point to the bottom axis intersection point, and wherein the bottom section height is greater than zero;

wherein the inner perimeter of the cross-section comprises a bottom perimeter section containing the bottom point, wherein the bottom perimeter section comprises a bottom perimeter section length measured along the inner perimeter from the first point to the second point;

wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;

wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;

wherein the top section height is equal to the bottom section height;

wherein the bottom perimeter section length is greater than the top perimeter section length such that more of the tubular filter media faces downward than upward when the filter cartridge is oriented with the bottom perimeter facing downward;

and wherein an inscribed circle located within the inner perimeter of the cross-section occupies less than all and 60% or more of an inner area defined by the inner perimeter.

16. A filter cartridge according to claim 15, wherein the bottom section height is less than or equal to 0.4 of the maximum height measured along the axis of maximum height from the top point to the bottom point.

17. A filter cartridge according to claim 15, wherein the bottom perimeter section length is 1.2 or more times greater than the top perimeter section length.

18. A filter cartridge according to claim 15, wherein an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle.

19. A filter cartridge according to claim 15, wherein the cross-section is taken transverse to the tube axis at any location along 10% or more of the tubular filter media length.

20. A filter cartridge according to claim 15, wherein an inscribed circle located within the inner perimeter of the cross-section defines a maximum radial gap between the circle and the inner perimeter that is 0.25 or less of a diameter of the inscribed circle, wherein the maximum radial gap is measured along a radial line extending through a center of the inscribed circle.

21. A filter cartridge comprising:
    tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;
    a filter cartridge housing comprising a first end cap at the first end of the tubular filter media and a second end cap at the second end of the tubular filter media;
    wherein, in a cross-section taken transverse to the tube axis at any location along a majority of the tubular filter media length, the interior surface of the tubular filter media defines an inner perimeter;
    wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;
    wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;
    wherein the cross-section comprises a bottom section height measured along the axis of maximum height from the bottom point to the bottom axis intersection point, wherein the bottom section height is greater than zero;
    wherein the inner perimeter of the cross-section comprises a bottom perimeter section containing the bottom point, wherein the bottom perimeter section comprises a bottom perimeter section length measured along the inner perimeter from the first point to the second point;
    wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;
    wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;
    wherein the top section height is equal to the bottom section height;
    wherein the bottom perimeter section length is greater than the top perimeter section length;
    and wherein an inscribed circle located within the inner perimeter of the cross-section occupies less than all and 60% or more of an inner area defined by the inner perimeter.

22. A filter cartridge according to claim 21, wherein the bottom perimeter section length is 1.2 or more times greater than the top perimeter section length.

23. A filter cartridge according to claim 21, wherein the bottom section height is greater than or equal to 0.1 of the maximum height.

24. A filter cartridge according to claim 21, wherein the bottom section height is less than or equal to 0.4 of the maximum height measured along the axis of maximum height from the top point to the bottom point.

25. A filter cartridge according to claim 21, wherein no section of the inner perimeter between the first point and the second point lies on a straight line for a distance of more than 1 centimeter.

26. A filter cartridge according to claim 21, wherein the axis of maximum height does not lie on a line of symmetry of the inner perimeter of the cross-section.

27. A filter cartridge according to claim 21, wherein the inner perimeter of the cross-section is asymmetric.

28. A filter cartridge according to claim 21, wherein an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle.

29. A filter cartridge according to claim 21, wherein the cross-section is taken transverse to the tube axis at any location along 10% or more of the tubular filter media length.

30. A filter cartridge according to claim 21, wherein an inscribed circle located within the inner perimeter of the cross-section defines a maximum radial gap between the circle and the inner perimeter that is 0.25 or less of a diameter of the inscribed circle, wherein the maximum radial gap is measured along a radial line extending through a center of the inscribed circle.

31. A filter cartridge according to claim 1, wherein the inner perimeter comprises a size at the first end cap is that the same as a size of the inner perimeter at the second end cap.

32. A filter cartridge according to claim 15, wherein the inner perimeter comprises a size at the first end cap is that the same as a size of the inner perimeter at the second end cap.

33. A filter cartridge according to claim 21, wherein the inner perimeter comprises a size at the first end cap is that the same as a size of the inner perimeter at the second end cap.

34. A filter cartridge according to claim 1, wherein the inscribed circle located within the inner perimeter of the cross-section occupies 70% or more of the inner area defined by the inner perimeter.

35. A filter cartridge according to claim 1, wherein the inscribed circle located within the inner perimeter of the cross-section occupies 80% or more of the inner area defined by the inner perimeter.

36. A filter cartridge according to claim 15, wherein the inscribed circle located within the inner perimeter of the cross-section occupies 70% or more of the inner area defined by the inner perimeter.

37. A filter cartridge according to claim 15, wherein the inscribed circle located within the inner perimeter of the cross-section occupies 80% or more of the inner area defined by the inner perimeter.

38. A filter cartridge according to claim 21, wherein the inscribed circle located within the inner perimeter of the cross-section occupies 70% or more of the inner area defined by the inner perimeter.

39. A filter cartridge according to claim 21, wherein the inscribed circle located within the inner perimeter of the cross-section occupies 80% or more of the inner area defined by the inner perimeter.

40. A filter cartridge comprising:
   tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;
   a filter cartridge housing comprising a first end cap at the first end of the tubular filter media and a second end cap at the second end of the tubular filter media;
   wherein, in a cross-section taken transverse to the tube axis at any location along a majority of the tubular filter media length, the interior surface of the tubular filter media defines an inner perimeter;
   wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;
   wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;
   wherein the bottom axis intersection point does not bisect the maximum height of the cross-section as measured between the top and bottom points;
   wherein the cross-section comprises a bottom section height measured along the axis of maximum height from the bottom point to the bottom axis intersection point, and wherein the bottom section height is less than or equal to 0.4 of the maximum height measured along the axis of maximum height from the top point to the bottom point;
   wherein the inner perimeter of the cross-section comprises a bottom perimeter section containing the bottom point, wherein the bottom perimeter section comprises a bottom perimeter section length measured along the inner perimeter from the first point to the second point;
   wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;
   wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;
   wherein the top section height is equal to the bottom section height;
   wherein the bottom perimeter section length is greater than the top perimeter section length such that more of the tubular filter media faces downward than upward when the filter cartridge is oriented with the bottom perimeter facing downward;
   and wherein an inscribed circle located within the inner perimeter of the cross-section defines a maximum radial gap between the circle and the inner perimeter that is 0.25 or less of a diameter of the inscribed circle, wherein the maximum radial gap is measured along a radial line extending through a center of the inscribed circle.

41. A filter cartridge according to claim 40, wherein the bottom section height is greater than zero.

42. A filter cartridge according to claim 40, wherein the bottom section height is greater than or equal to 0.1 of the maximum height.

43. A filter cartridge according to claim 40, wherein the bottom perimeter section length is 1.2 or more times greater than the top perimeter section length.

44. A filter cartridge according to claim 40, wherein the bottom perimeter section length is 2 or more times greater than the top perimeter section length.

45. A filter cartridge according to claim 40, wherein the entire bottom perimeter section is continuously curved from the first point to the second point.

46. A filter cartridge according to claim 40, wherein no section of the inner perimeter between the first point and the second point lies on a straight line for a distance of more than 1 centimeter.

47. A filter cartridge according to claim 40, wherein the axis of maximum height does not lie on a line of symmetry of the inner perimeter of the cross-section.

48. A filter cartridge according to claim 40, wherein the inner perimeter of the cross-section defines only one line of symmetry.

49. A filter cartridge according to claim 40, wherein the inner perimeter of the cross-section defines only one line of symmetry, and wherein the axis of maximum height is coincident with the line of symmetry.

50. A filter cartridge according to claim 40, wherein the inner perimeter of the cross-section is asymmetric.

51. A filter cartridge according to claim 40, wherein an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle.

52. A filter cartridge according to claim 40, wherein the cross-section is taken transverse to the tube axis at any location along 10% or more of the tubular filter media length.

53. A filter cartridge according to claim 40, wherein the inscribed circle located within the inner perimeter of the cross-section occupies 70% or more of an inner area defined by the inner perimeter.

54. A filter cartridge according to claim 40, wherein the inscribed circle located within the inner perimeter of the cross-section occupies 80% or more of an inner area defined by the inner perimeter.

55. A filter cartridge comprising:
  tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;
  a filter cartridge housing comprising a first end cap at the first end of the tubular filter media and a second end cap at the second end of the tubular filter media;
  wherein, in a cross-section taken transverse to the tube axis at any location along a majority of the tubular filter media length, the interior surface of the tubular filter media defines an inner perimeter having a continuously curved asymmetric ovate shape;
  wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;
  wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;
  and wherein the bottom axis intersection point does not bisect the maximum height of the cross-section as measured between the top and bottom points;
  wherein the cross-section comprises a bottom section height measured along the axis of maximum height from the bottom point to the bottom axis intersection point, and wherein the bottom section height is greater than zero;
  wherein the inner perimeter of the cross-section comprises a bottom perimeter section containing the bottom point, wherein the bottom perimeter section comprises a bottom perimeter section length measured along the inner perimeter from the first point to the second point;
  wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;
  wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;
  wherein the top section height is equal to the bottom section height;
  wherein the bottom perimeter section length is greater than the top perimeter section length such that more of the tubular filter media faces downward than upward when the filter cartridge is oriented with the bottom perimeter facing downward;
  and wherein an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle.

56. A filter cartridge according to claim 55, wherein the bottom section height is less than or equal to 0.4 of the maximum height measured along the axis of maximum height from the top point to the bottom point.

57. A filter cartridge according to claim 55, wherein the bottom perimeter section length is 1.2 or more times greater than the top perimeter section length.

58. A filter cartridge according to claim 55, wherein the cross-section is taken transverse to the tube axis at any location along 10% or more of the tubular filter media length.

59. A filter cartridge according to claim 55, wherein the inscribed circle located within the inner perimeter of the cross-section occupies 70% or more of an inner area defined by the inner perimeter.

60. A filter cartridge according to claim 55, wherein the inscribed circle located within the inner perimeter of the cross-section occupies 80% or more of an inner area defined by the inner perimeter.

61. A filter cartridge comprising:
tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;
a filter cartridge housing comprising a first end cap at the first end of the tubular filter media and a second end cap at the second end of the tubular filter media;
wherein, in a cross-section taken transverse to the tube axis at any location along a majority of the tubular filter media length, the interior surface of the tubular filter media defines an inner perimeter having a continuously curved asymmetric ovate shape;
wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;
wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;
and wherein the bottom axis intersection point does not bisect the maximum height of the cross-section as measured between the top and bottom points;
wherein the cross-section comprises a bottom section height measured along the axis of maximum height from the bottom point to the bottom axis intersection point, and wherein the bottom section height is greater than zero;
wherein the inner perimeter of the cross-section comprises a bottom perimeter section containing the bottom point, wherein the bottom perimeter section comprises a bottom perimeter section length measured along the inner perimeter from the first point to the second point;
wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;
wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;
wherein the top section height is equal to the bottom section height;
wherein the bottom perimeter section length is greater than the top perimeter section length such that more of the tubular filter media faces downward than upward when the filter cartridge is oriented with the bottom perimeter facing downward;
and wherein an inscribed circle located within the inner perimeter of the cross-section defines a maximum radial gap between the circle and the inner perimeter that is 0.25 or less of a diameter of the inscribed circle, wherein the maximum radial gap is measured along a radial line extending through a center of the inscribed circle.

62. A filter cartridge according to claim 61, wherein the bottom section height is less than or equal to 0.4 of the maximum height measured along the axis of maximum height from the top point to the bottom point.

63. A filter cartridge according to claim 61, wherein the bottom perimeter section length is 1.2 or more times greater than the top perimeter section length.

64. A filter cartridge according to claim 61, wherein the cross-section is taken transverse to the tube axis at any location along 10% or more of the tubular filter media length.

65. A filter cartridge according to claim 61, wherein the inscribed circle located within the inner perimeter of the cross-section occupies 70% or more of an inner area defined by the inner perimeter.

66. A filter cartridge according to claim 61, wherein the inscribed circle located within the inner perimeter of the cross-section occupies 80% or more of an inner area defined by the inner perimeter.

67. A filter cartridge comprising:
tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;
a filter cartridge housing comprising a first end cap at the first end of the tubular filter media and a second end cap at the second end of the tubular filter media;
wherein, in a cross-section taken transverse to the tube axis at any location along a majority of the tubular filter media length, the interior surface of the tubular filter media defines an inner perimeter;
wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;

wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;

wherein the cross-section comprises a bottom section height measured along the axis of maximum height from the bottom point to the bottom axis intersection point, wherein the bottom section height is greater than zero;

wherein the inner perimeter of the cross-section comprises a bottom perimeter section containing the bottom point, wherein the bottom perimeter section comprises a bottom perimeter section length measured along the inner perimeter from the first point to the second point;

wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;

wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;

wherein the top section height is equal to the bottom section height;

wherein the bottom perimeter section length is greater than the top perimeter section length;

and wherein an inscribed circle located within the inner perimeter of the cross-section defines a maximum radial gap between the circle and the inner perimeter that is 0.5 or less of a diameter of the inscribed circle, wherein the maximum radial gap is measured along a radial line extending through a center of the inscribed circle.

68. A filter cartridge according to claim 67, wherein the bottom perimeter section length is 1.2 or more times greater than the top perimeter section length.

69. A filter cartridge according to claim 67, wherein the bottom section height is greater than or equal to 0.1 of the maximum height.

70. A filter cartridge according to claim 67, wherein the bottom section height is less than or equal to 0.4 of the maximum height measured along the axis of maximum height from the top point to the bottom point.

71. A filter cartridge according to claim 67, wherein no section of the inner perimeter between the first point and the second point lies on a straight line for a distance of more than 1 centimeter.

72. A filter cartridge according to claim 67, wherein the axis of maximum height does not lie on a line of symmetry of the inner perimeter of the cross-section.

73. A filter cartridge according to claim 67, wherein the inner perimeter of the cross-section is asymmetric.

74. A filter cartridge according to claim 67, wherein the cross-section is taken transverse to the tube axis at any location along 10% or more of the tubular filter media length.

75. A filter cartridge according to claim 67, wherein the inner perimeter comprises a size at the first end cap is that the same as a size of the inner perimeter at the second end cap.

76. A filter cartridge according to claim 67, wherein the inscribed circle located within the inner perimeter of the cross-section occupies 70% or more of an inner area defined by the inner perimeter.

77. A filter cartridge according to claim 67, wherein the inscribed circle located within the inner perimeter of the cross-section occupies 80% or more of an inner area defined by the inner perimeter.

78. A filter cartridge comprising:

tubular filter media defining an interior surface facing an interior volume of the filter cartridge and an exterior surface facing away from the interior volume, wherein the tubular filter media defines a tubular filter media length measured along a tube axis extending from a first end to a second end of the tubular filter media;

a filter cartridge housing comprising a first end cap at the first end of the tubular filter media and a second end cap at the second end of the tubular filter media;

wherein, in a cross-section taken transverse to the tube axis at any location along a majority of the tubular filter media length, the interior surface of the tubular filter media defines an inner perimeter;

wherein the cross-section comprises a maximum height (Hmax) measured between a top point and a bottom point, wherein the top point and the bottom point are located on the inner perimeter and an axis of maximum height that extends across the cross-section at a location and in an orientation such that the top point and the bottom point are points on the inner perimeter that are furthest apart from each other along any straight line extending across the cross-section;

wherein the cross-section comprises a maximum width (Wmax) measured between a first point and a second point located on the inner perimeter and on an axis of maximum width, wherein the axis of maximum width is located along a straight line perpendicular to the axis of maximum height, and wherein the axis of maximum width intersects the axis of maximum height at a bottom axis intersection point where the first point and the second point are furthest from each other on any straight line perpendicular to the axis of maximum height;

wherein the cross-section comprises a bottom section height measured along the axis of maximum height from the bottom point to the bottom axis intersection point, wherein the bottom section height is greater than zero;

wherein the inner perimeter of the cross-section comprises a bottom perimeter section containing the bottom point, wherein the bottom perimeter section comprises a bottom perimeter section length measured along the inner perimeter from the first point to the second point;

wherein the inner perimeter of the cross-section comprises a top perimeter section containing the top point, wherein the top perimeter section extends from a first end to a second end, wherein the first end is located on the inner perimeter between the first point and the top point and the second end is located on the inner perimeter between the second point and the top point, wherein first end and the second end of the top perimeter section are the points at which a top perimeter section line intersects the inner perimeter, and wherein the top perimeter section comprises a top perimeter section length measured along the inner perimeter from the first end to the second end;

wherein the top perimeter section line is a straight line that is perpendicular to the axis of maximum height and that intersects the axis of maximum height at a top axis intersection point, wherein the cross-section comprises a top section height measured along the axis of maximum height from the top axis intersection point to the top point on the inner perimeter;

wherein the top section height is equal to the bottom section height;

wherein the bottom perimeter section length is greater than the top perimeter section length;

and wherein an inscribed circle located within the inner perimeter of the cross-section defines a maximum radial gap between the circle and the inner perimeter that is 0.25 or less of a diameter of the inscribed circle, wherein the maximum radial gap is measured along a radial line extending through a center of the inscribed circle.

79. A filter cartridge according to claim 78, wherein the bottom perimeter section length is 1.2 or more times greater than the top perimeter section length.

80. A filter cartridge according to claim 78, wherein the bottom section height is greater than or equal to 0.1 of the maximum height.

81. A filter cartridge according to claim 78, wherein the bottom section height is less than or equal to 0.4 of the maximum height measured along the axis of maximum height from the top point to the bottom point.

82. A filter cartridge according to claim 78, wherein no section of the inner perimeter between the first point and the second point lies on a straight line for a distance of more than 1 centimeter.

83. A filter cartridge according to claim 78, wherein the axis of maximum height does not lie on a line of symmetry of the inner perimeter of the cross-section.

84. A filter cartridge according to claim 78, wherein the inner perimeter of the cross-section is asymmetric.

85. A filter cartridge according to claim 78, wherein the cross-section is taken transverse to the tube axis at any location along 10% or more of the tubular filter media length.

86. A filter cartridge according to claim 78, wherein the inner perimeter comprises a size at the first end cap is that the same as a size of the inner perimeter at the second end cap.

87. A filter cartridge according to claim 78, wherein the inscribed circle located within the inner perimeter of the cross-section occupies 70% or more of an inner area defined by the inner perimeter.

88. A filter cartridge according to claim 78, wherein the inscribed circle located within the inner perimeter of the cross-section occupies 80% or more of an inner area defined by the inner perimeter.

* * * * *